(12) United States Patent
Okumoto et al.

(10) Patent No.: US 7,671,508 B2
(45) Date of Patent: Mar. 2, 2010

(54) AUTOMOTIVE ALTERNATOR HAVING IMPROVED STRUCTURE FOR EFFECTIVELY COOLING FIELD COIL

(75) Inventors: Kazushige Okumoto, Kariya (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 305 days.

(21) Appl. No.: 11/798,740

(22) Filed: May 16, 2007

(65) Prior Publication Data

US 2007/0273243 A1 Nov. 29, 2007

(30) Foreign Application Priority Data

May 25, 2006 (JP) .............. 2006-145264

(51) Int. Cl.
*H02K 1/22* (2006.01)
*H02K 19/16* (2006.01)
*H02K 19/34* (2006.01)
*H02K 16/00* (2006.01)

(52) U.S. Cl. .................. 310/263; 310/114; 310/156.66; 310/156.69

(58) Field of Classification Search .............. 310/263, 310/114, 156.66, 156.67, 156.68, 156.69, 310/156.71
See application file for complete search history.

(56) References Cited

U.S. PATENT DOCUMENTS

| 4,418,295 | A | | 11/1983 | Shiga | |
|---|---|---|---|---|---|
| 4,549,103 | A | | 10/1985 | Shiga | |
| 4,980,595 | A | * | 12/1990 | Arora | 310/263 |
| 5,177,388 | A | * | 1/1993 | Hotta et al. | 310/114 |
| 5,233,255 | A | | 8/1993 | Kusumoto et al. | |
| 7,067,954 | B2 | * | 6/2006 | Kuribayashi et al. | 310/263 |
| 7,397,157 | B2 | * | 7/2008 | Maekawa et al. | 310/114 |
| 7,417,355 | B2 | * | 8/2008 | Shichijo et al. | 310/263 |
| 7,420,313 | B2 | * | 9/2008 | Okumoto et al. | 310/263 |
| 2004/0174089 | A1 | * | 9/2004 | Maeda et al. | 310/263 |
| 2005/0006978 | A1 | * | 1/2005 | Bradfield | 310/263 |
| 2007/0236098 | A1 | * | 10/2007 | Kusase et al. | 310/263 |

FOREIGN PATENT DOCUMENTS

| JP | A 56-53555 | | 5/1981 |
|---|---|---|---|
| JP | U 5-11769 | | 2/1993 |
| JP | 05-83906 | * | 4/1993 |

* cited by examiner

*Primary Examiner*—Burton Mullins
(74) *Attorney, Agent, or Firm*—Oliff & Berridge, PLC

(57) ABSTRACT

According to the present invention, an alternator includes a rotor, a stator, and at least one cooling fan. The rotor includes a rotary shaft, a field core, and a field coil. The field coil has first and second ends that are opposite to each other in an axial direction of the rotary shaft. The stator includes an armature core and an armature coil. The armature core has first and second ends that are opposite to each other in the axial direction. The first end of the armature core is closer to the first end than the second end of the field coil. An axial distance between the first and second ends of the field coil is less than that between the first and second ends of the armature core. The first end of the field coil protrudes outward from the first end of the armature core in the axial direction.

12 Claims, 3 Drawing Sheets

AUTOMOTIVE ALTERNATOR HAVING IMPROVED STRUCTURE FOR EFFECTIVELY COOLING FIELD COIL

CROSS-REFERENCE TO RELATED APPLICATION

This application is based on and claims priority from Japanese Patent Application No. 2006-145264, filed on May 25, 2006, the content of which is hereby incorporated by reference into this application.

BACKGROUND OF THE INVENTION

1. Technical Field of the Invention

The present invention relates generally to alternators. More particularly, the invention relates to an automotive alternator which has an improved structure for effectively cooling a field coil thereof.

2. Description of the Related Art

A conventional method of increasing the power output of an automotive alternator is to increase the magnetomotive force of a field coil of the alternator. Further, a possible way of increasing the magnetomotive force of the field coil is to reduce the impedance of the field coil. However, with continuous running of the alternator, the temperature of the field coil will increase due to heat generated by the field coil. Consequently, the resistance of the field coil will increase, thus reducing the magnetomotive force of the field coil.

Accordingly, it is necessary to effectively cool the field coil. However, the field coil is generally disposed in a center portion of a field core of the alternator, and the outer periphery of the field core is generally surrounded by a stator of the alternator. That is to say, the field coil is disposed in a place where it is difficult for the field coil to be effectively cooled by the cooling air flow created by a cooling fan of the alternator. In particular, when the field core is configured with a pair of lundell-type pole cores and there are further disposed a plurality of permanent magnets between the claws of the pole cores for improving the efficiency of the alternator, the vicinity of the field coil is so congested that it is difficult for the field coil to be exposed to the cooling air flow.

U.S. Pat. No. 5,233,255 discloses an automotive alternator, where the radial height of the pole cores is made greater than the axial length of the same, so as to increase the contact area between the pole cores and the field coil and thereby enhance the heat transfer from the field coil to the pole cores.

However, with the increase in the radial height of the pole cores, the outer diameter of the entire alternator accordingly increases, thus making the alternator difficult to be installed in the engine compartment of an automobile.

U.S. Pat. No. 4,418,295 discloses an automotive alternator, where a mixed flow fan is employed to create not only a radial air flow for cooling the armature coil but also an axial air flow for cooling the field coil.

However, when the number of turns and thus the outer diameter of the field coil is increased for the purpose of increasing the power output of the alternator or a plurality of permanent magnets are disposed between the claws of the pole cores as described above, it is still difficult for the field coil to be reliably exposed to the cooling air flows created by the cooling fan.

SUMMARY OF THE INVENTION

The present invention has been made in view of the above-mentioned problems.

It is, therefore, a primary object of the present invention to provide an alternator which has an improved structure for effectively cooling a field coil thereof.

According to a first aspect of the present invention, there is provided an alternator which includes a rotor, a stator, and at least one cooling fan. The rotor includes a rotary shaft, a field core, and a field coil. The field core is fixed on the rotary shaft. The field coil is wound around the field core and has a first and a second end that are opposite to each other in an axial direction of the rotary shaft. The stator includes an armature core and an armature coil. The armature core surrounds an outer periphery of the field core and has a first and a second end that are opposite to each other in the axial direction of the rotary shaft. The first end of the armature core is closer to the first end of the field coil than the second end of the field coil in the axial direction. The armature coil is wound around the armature core. The at least one cooling fan is fixed on the rotary shaft so as to create a cooling air flow with rotation of the rotary shaft. Further, a distance between the first and second ends of the field coil is less than a distance between the first and second ends of the armature core in the axial direction of the rotary shaft; the first end of the field coil protrudes outward from the first end of the armature core in the axial direction of the rotary shaft.

With the above configuration, the field coil can be reliably exposed to the cooling air flow created by the at least one cooling fan. Consequently, the field coil can be effectively cooled, thus suppressing temperature rise of the field coil and securing a high power output of the alternator.

In a further implementation of the invention, the field core is configured with a pair of lundell-type pole cores each having a plurality of claws extending in the axial direction of the rotary shaft. The claws of one of the pole cores are interleaved with the claws of the other pole core.

The rotor further includes a plurality of permanent magnets each of which is interposed between adjacent two of the claws of the pole cores in a circumferential direction of the rotary shaft.

The rotor further includes a second field core and a second field coil. The second field core is fixed on the rotary shaft in tandem with the field core. The second field coil is wound around the second field core and has a first and a second end that are opposite each other in the axial direction of the rotary shaft. The first end of the second field coil is closer to the first end of the field coil than the second end of the field coil in the axial direction. The stator further includes a second armature core and a second armature coil. The second armature core surrounds an outer periphery of the second field core and has a first and a second end that are opposite to each other in the axial direction of the rotary shaft. The first end of the second armature core is closer to the first end of the armature core than the second end of the armature core in the axial direction. The second armature coil is wound around the second armature core. The at least one cooling fan includes a first cooling fan fixed to the field core and a second cooling fan fixed to the second field core. Further, a distance between the first and second ends of the second field coil is less than a distance between the first and second ends of the second armature core in the axial direction of the rotary shaft; the first end of the second field coil protrudes outward from the first end of the second armature core in the axial direction of the rotary shaft.

The second field core is configured with a second pair of lundell-type pole cores each having a plurality of claws extending in the axial direction of the rotary shaft. The claws of one of the second pair of pole cores are interleaved with the claws of the other of the second pair.

The rotor further includes a plurality of permanent magnets each of which is interposed between adjacent two of the claws of the second pair of pole cores in the circumferential direction of the rotary shaft.

The rotary shaft is configured to be driven by an engine of an automobile.

According to a second aspect of the present invention, there is provided another alternator which includes a rotor, a stator, and at least one cooling fan. The rotor includes a rotary shaft, a field core, and a field coil. The field core is fixed on the rotary shaft and has a first and a second end that are opposite to each other in an axial direction of the rotary shaft. The field coil is wound around the field core. The stator includes an armature core and an armature coil. The armature core surrounds an outer periphery of the field core and has a first and a second end that are opposite to each other in the axial direction of the rotary shaft. The first end of the armature core is closer to the first end of the field core than the second end of the field core in the axial direction. The armature coil is wound around the armature core and has a first and a second end that protrude respectively from the first and second ends of the armature core. The at least one cooling fan is fixed on the rotary shaft so as to create a cooling air flow with rotation of the rotary shaft. Further, a distance between the first and second ends of the field core is less than a distance between the first and second ends of the armature coil in the axial direction of the rotary shaft; the first end of the field core protrudes outward from the first end of the armature coil in the axial direction of the rotary shaft.

With the above configuration, there will be a difference in pressure between the first end of the field core and the second end of the field core, thus increasing the component of the cooling air flow created by the at least one cooling fan in the axial direction of the rotary shaft. Consequently, the field coil can be effectively cooled, thus suppressing temperature rise of the field coil and securing a high power output of the alternator.

In a further implementation, the at least one cooling fan comprises a cooling fan that is fixed to the second end of the field core and disposed radially inward of an end portion of the armature coil, which extends in the axial direction of the rotary shaft between the second ends of the armature core and the armature coil, so as to face a whole radially inner surface of the end portion of the armature coil.

The cooling fan is welded to the second end of the field core with weld beads formed linearly and continuously.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

Figure 1:
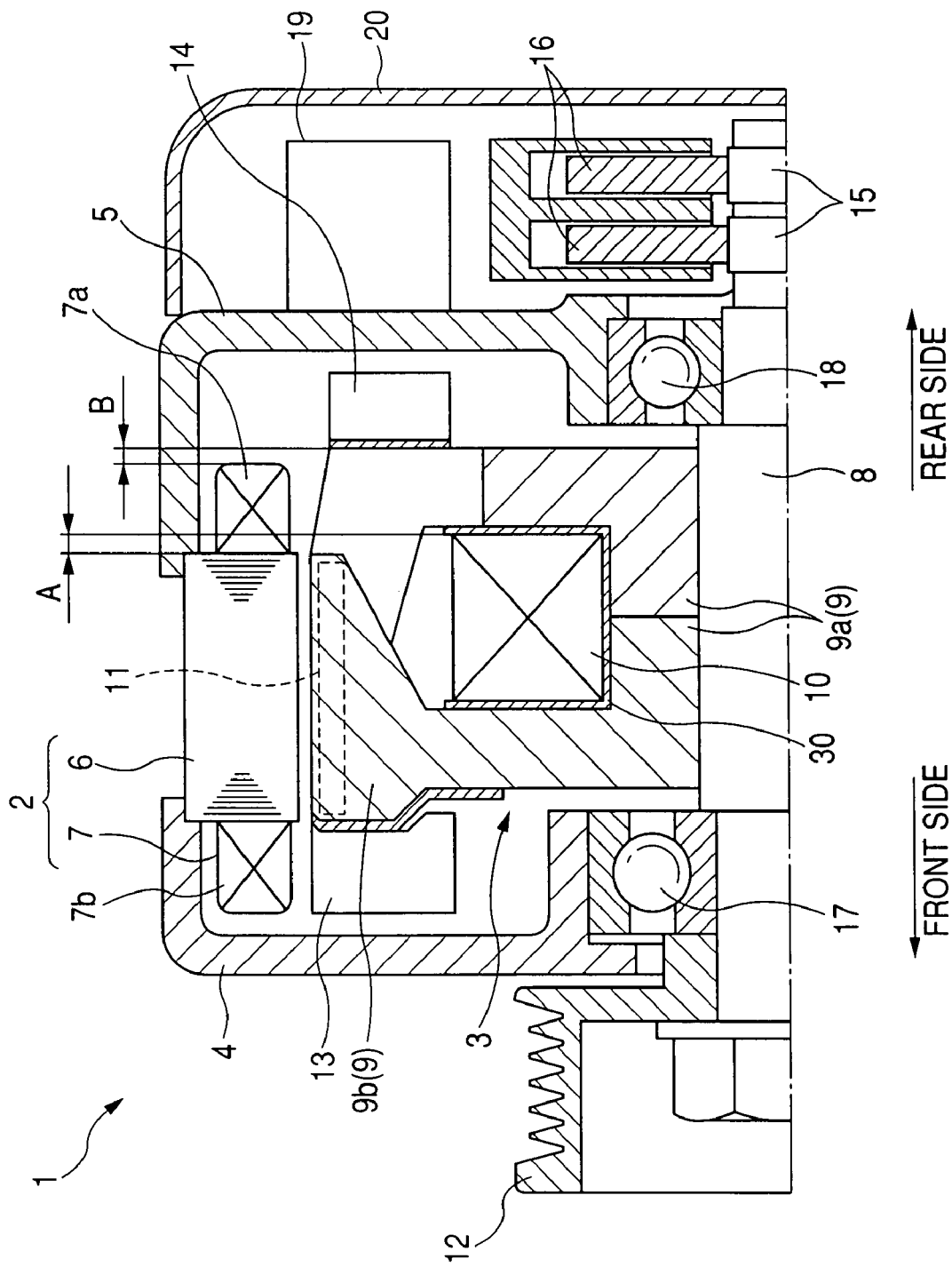
FIG. 1 is a partially cross-sectional side view showing the overall configuration of an automotive alternator according to the first embodiment of the invention.

The preferred embodiments of the present invention will be described hereinafter with reference to FIGS. 1-3.

It should be noted that, for the sake of clarity and understanding, identical components having identical functions in different embodiments of the invention have been marked, where possible, with the same reference numerals in each of the figures.

First Embodiment

FIG. 1 shows the overall configuration of an automotive alternator 1 according to the first embodiment of the invention.

As shown in FIG. 1, the alternator 1 includes a stator 2 serving as an armature, a rotor 3 serving as a field, and front and rear frames 4 and 5 that together support the stator 2 and the rotor 3.

The stator 2 includes an annular armature core (or stator core) 6 and an armature coil 7 wound around the armature core 6. Specifically, the armature core 6 has formed on the inner periphery thereof a plurality of slots (not shown). The armature coil 7 is wound through the slots of the armature core 6 with a front end portion 7b and a rear end portion 7a of the armature coil 7 protruding respectively from the front and rear ends of the armature core 6.

The rotor 3 includes a rotary shaft 8 configured to be driven by an engine of an automobile, a field core that is composed of a pair of lundell-type pole cores 9 fixed on the rotary shaft 8, a field coil 10 wound around the pole cores 9, and a plurality of permanent magnets 11 disposed between the pole cores 9.

The rotary shaft 8 has a front end portion on which a pulley 12 is mounted. The rotating force of the engine is transmitted to the rotary shaft 8 via a belt (not shown) fitted on the pulley 12.

Each of the pole cores 9 includes a boss portion 9a, which is serration-fitted on the rotary shaft 8, and a plurality of claw portions 9b each of which extends from the boss portion 9a first outward in the radial direction and then forward or backward in the axial direction of the rotary shaft 8. The pole cores 9 are so assembled that the claw portions 9b of one of the pole cores 9 are interleaved with those of the other pole core 9.

On the front and rear ends of the pole cores 9, there are respectively fixed cooling fans 13 and 14 to create a cooling air flow with rotation of the rotary shaft 8.

The field coil 10 is wound in a winding space around the boss portions 9a of the pole cores 9 via a resin-made bobbin 30. Further, the field coil 10 is electrically connected to slip rings 15 provided on a rear end portion of the rotary shaft 8, so as to receive a field current from a battery (not shown) through sliding contacts between the slip rings 15 and brushes 16 arranged on the outer periphery of the slip rings 15. As well-known in the art, when the field current is supplied to the field coil 10, each of the claw portions 9b of one of the pole cores 9 becomes a south pole, while each of the claw portions 9b of the other pole core 9 becomes a north pole.

Each of the permanent magnets 11 is interposed between adjacent two of the claw portions 9b of the pole cores 9 in the circumferential direction of the rotary shaft 8. Further, each of the permanent magnets 11 is magnetized so as to diminish the magnetic flux leakage between the two adjacent claw portions 9b. More specifically, each of the permanent magnets 11 is polarized so as to have, on each circumferential side face thereof, the same polarity as the claw portion 6b facing the each circumferential side face. In addition, the permanent magnets 11 may be made up of, for example, ferrite magnets, resin magnets that are formed by sintering powder of nylon, Nd, Fe, and B, or rare earth magnets.

The front and rear frames 3 and 4 are cup-shaped and assembled together with the armature core 6 fixed therebetween. Further, in the front and rear frames 3 and 4, there are respectively provided bearings 17 and 18, through which the rotary shaft 8 is rotatably supported by the front and rear frames 3 and 4. The front end portion of the rotary shaft 8 protrudes from an end wall of the front fame 3, so as to allow the pulley 12 to be mounted thereon. Similarly, the rear end portion of the rotary shaft 8 protrudes from an end wall of the rear frame 4, so as to allow the slip rings 15 to be provided thereon. Each of the front and rear frames 3 and 4 has a plurality of cooling air inlets (not shown) formed through the end wall thereof and arranged around the rotary shaft 8 and a plurality of cooling air outlets (not shown) formed through a side wall thereof and arranged along the circumferential direction of the rotary shaft 8.

On the outer surface of the end wall of the rear frame 4, there are disposed a rectifier (not shown) and a voltage regulator 19. The rectifier works to rectify an AC power output from the armature coil 7 into a DC power. The voltage regulator 19 works to regulate the voltage of the DC power through controlling the field current supplied to the field coil 10. The rectifier and the voltage regulator 19 are covered and are thus protected by a rear cover 20 that is fixed to the end wall of the rear frame 4 from outside by means of bolts (not shown).

After having described the overall configuration of the alternator 1, features and advantages thereof will be described hereinafter.

In the alternator 1, the axial length of the field coil 10 (i.e., the distance between the front and rear ends of the field coil 10 in the axial direction of the rotary shaft 8) is made smaller than the axial length of the armature core 6 (i.e., the distance between the front and rear ends of the armature core 6 in the axial direction of the rotary shaft 8). Further, the axial length of the pole cores 9 (i.e., the distance between the front and rear ends of the pole cores 9 in the axial direction of the rotary shaft 8) is made smaller than the axial length of the armature coil 7 (i.e., the distance between the front end of the front end portion 7b and the rear end of the rear end portion 7a in the axial direction of the rotary shaft 8). Furthermore, the axial center of the boss portions 9a of the pole cores 9 and the field coil 10 is offset backward from the axial center of the armature core 6. At the same time, the claw portions 9b of the pole cores 9 remain facing the whole inner surface of the armature core 6 in the radial direction of the rotary shaft 8.

Accordingly, in the alternator 1, the rear end of the field coil 10 is configured to protrude outward (i.e., backward) from the rear end of the armature core 6 in the axial direction of the rotary shaft 8 by A, as shown FIG. 1.

With this configuration, the field coil 7 can be reliably exposed to the cooling air flow created by the cooling fans 13 and 14 during operation.

Further, in the alternator 1, the rear end of the field core (i.e., the pole cores 9) is configured to protrude outward (i.e., backward) from the rear end of the armature coil 7 (i.e., the rear end of the rear end portion 7a of the armature coil 7) in the axial direction of the rotary shaft 8 by B, as shown in FIG. 1.

With this configuration, there will be a difference in pressure between on the front side and on the rear side of the field core (i.e., the pole cores 9) during operation, thus increasing the axial component of the cooling air flow created by the cooling fans 13 and 14.

Consequently, though there are disposed the permanent magnets 11 between the claw portions 9b of the pole cores 9, it is still possible to effectively cool the field coil 7, thus suppressing temperature rise of the field coil 7 and securing a high power output of the alternator 1.

Furthermore, in the alternator 1, the cooling fan 13 is arranged radially inward of the front end portion 7b of the armature coil 7 so as to face the whole inner surface of the front end portion 7b in the radial direction of the rotary shaft 8.

With this arrangement, it is possible to effectively cool the armature coil 7 by means of the radial component of the cooling air flow created by the cooling fan 13.

Second Embodiment

This embodiment illustrates a method of welding the cooling fans 13 and 14 to the pole cores 9. It should be noted that, for the sake of avoiding redundancy, only the welding of the cooling fan 13 to the pole cores 9 is described hereinafter.

Figure 2:
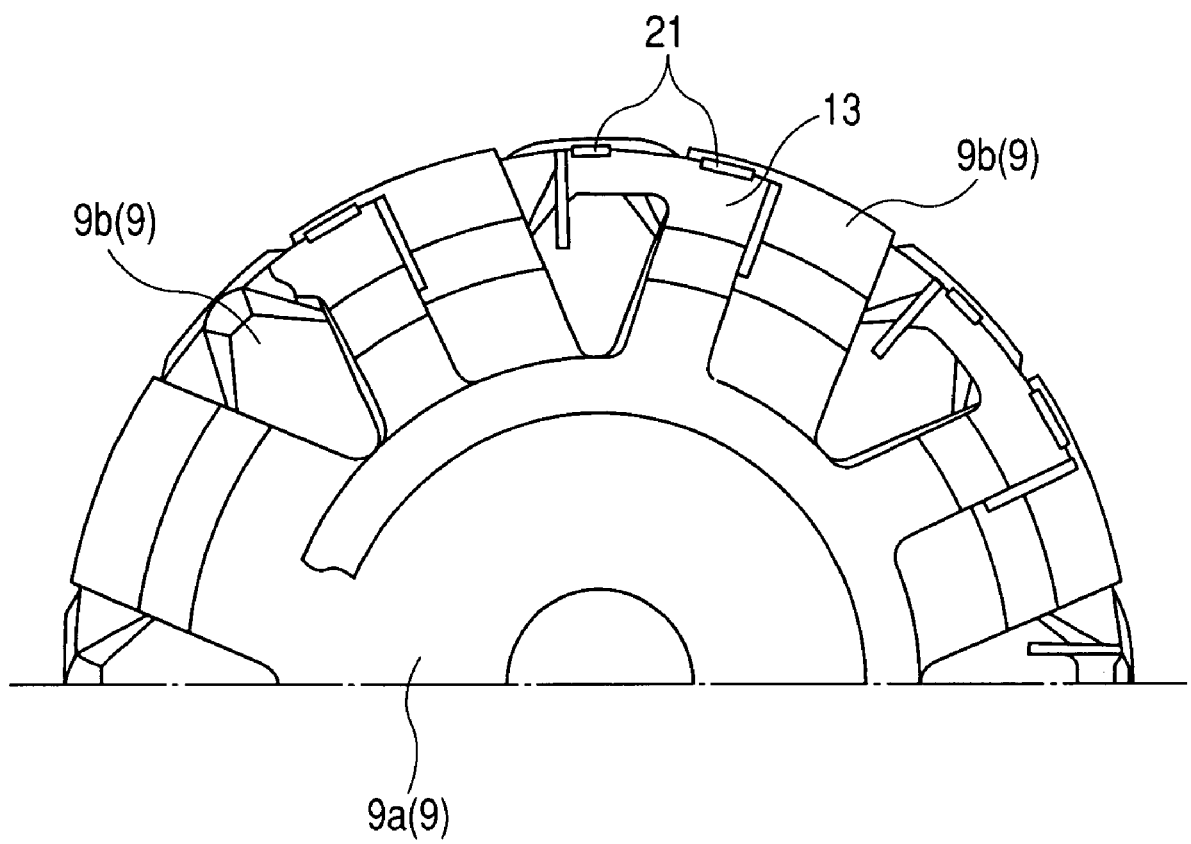
FIG. 2 is an axial end view illustrating a method of welding a cooling fan to pole cores of the alternator.

Referring to FIG. 2, in the present embodiment, the cooling fan 13 is welded to the front end face of the pole cores 9 with weld beads 21 formed linearly and continuously.

With such weld beads 21, it is possible to secure sufficient weld strength when TIG welding is applied which uses low welding current. That is to say, it is possible to secure sufficient weld strength without degaussing the permanent magnets 11 disposed between the claw portions 9b of the pole cores 9 during the TIG welding process.

Otherwise, if projection welding was applied which uses very high welding current, the permanent magnets 11 would be degaussed during the projection welding process.

In addition, laser welding may be applied, instead of TIG welding, to achieve the same effects.

Third Embodiment

This embodiment illustrates an automotive tandem alternator 1A according to the third embodiment of the invention.

Figure 3:
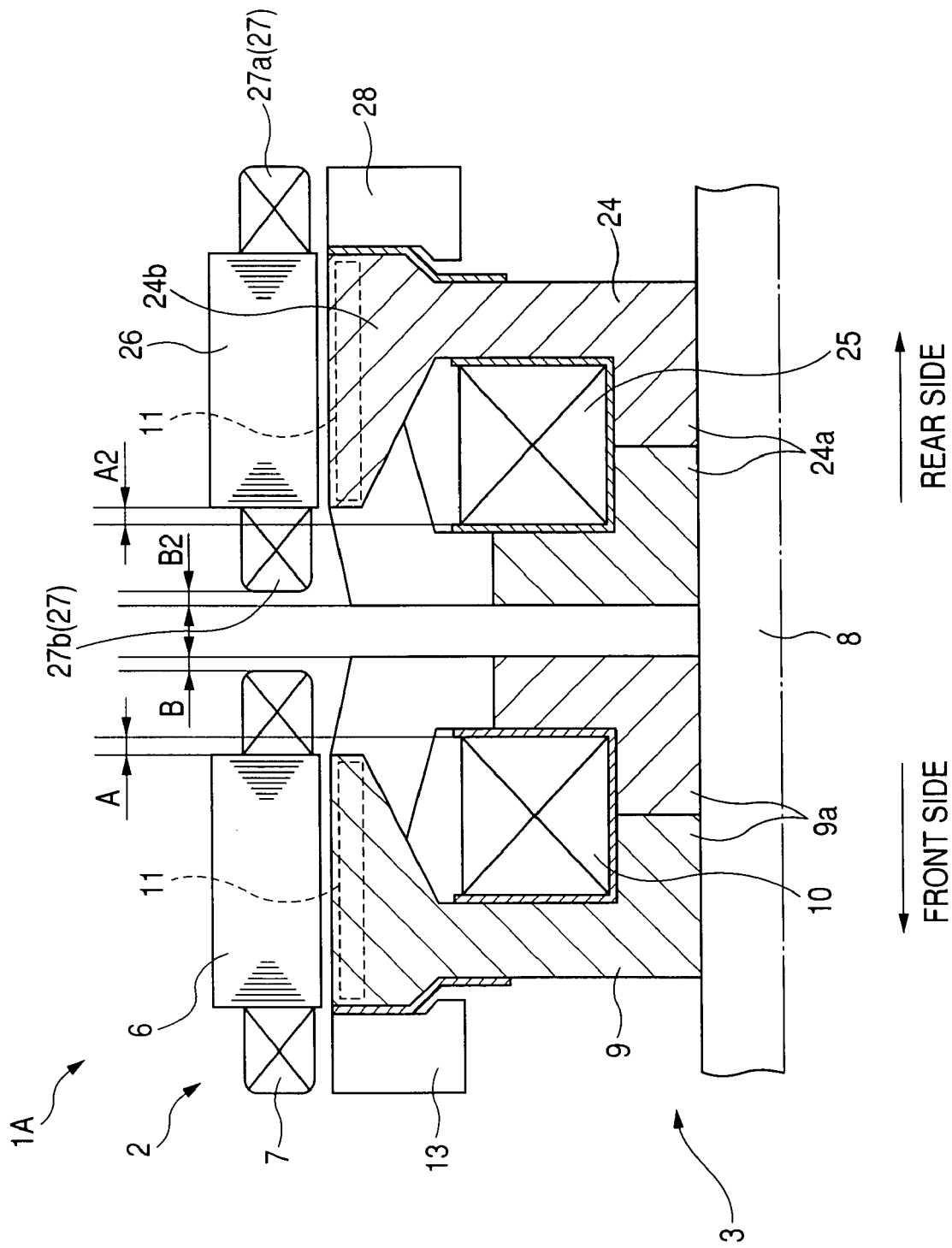
FIG. 3 is a partially cross-sectional side view showing the overall configuration of an automotive alternator according to the third embodiment of the invention.

Referring to FIG. 3, the tandem alternator 1 includes a pair of first and second power generation units that are arranged in tandem in the axial direction of the rotary shaft 8.

Specifically, in the present embodiment, the stator 2 includes a first armature, which consists of the armature core 6 and the armature coil 7 described in the first embodiment, and a second armature that consists of an armature core 26 and an armature coil 27. The rotor 3 includes a first field, which consists of the lundell-type pole cores 9, the field coil 10, and the permanent magnets 11 described in the first embodiment, and a second field that consists of a pair of lundell-type pole cores 24, a field coil 25, and a second group of permanent magnets 11.

The first armature and the first field together constitute the first power generation unit, while the second armature and the second field together constitute the second power generation unit. Further, all the components of the second power generation unit are respectively identical to those of the first power generation unit. However, the arrangement of the second power generation unit is reverse to that of the first power generation unit on the rotary shaft 8. That is to say, the axial center of the boss portions 24a of the pole cores 24 and the field coil 25 is offset forward from the axial center of the armature core 26.

Accordingly, the front end of the field coil 25 is configured to protrude forward from the front end of the armature core 26 in the axial direction of the rotary shaft 8 by A2, which may be equal to A, as shown in FIG. 3.

With this configuration, the field coil 25 can be reliably exposed to the cooling air flow created by a cooling fan 28 fixed to the rear end of the pole cores 24 and/or the cooling fan 13 during operation.

Further, the front end of the pole cores 24 is configured to protrude forward from the front end of the armature coil 27 in the axial direction of the rotary shaft 8 by B2, which may be equal to B, as shown in FIG. 3.

With this configuration, there will be a difference in pressure between the front side and the rear side of the pole cores 24 during operation, thus increasing the axial component of the cooling air flow created by the cooling fan 28.

Consequently, though the permanent magnets 11 are disposed between the claw portions 24b of the pole cores 24, it is still possible to effectively cool the field coil 25, thus suppressing temperature rise of the field coil 25 and securing a high power output of the second power generation unit.

Furthermore, the cooling fan 28 is arranged radially inward of a rear end portion 27a of the armature coil 27 so as to face the whole inner surface of the rear end portion 27a in the radial direction of the rotary shaft 8.

With this arrangement, it is possible to effectively cool the armature coil 27 by means of the radial component of the cooling air flow created by the cooling fan 28.

Moreover, the axial center of the boss portions 9a of the pole cores 9 is offset backward, while the axial center of the boss portions 24a of the pole cores 24 is offset forward. Consequently, the pole cores 9 of the first power generation unit and the pole cores 24 of the second power generation unit become closer to each other.

As a result, it becomes possible to effectively cool both the field coils 10 and 25 of the first and second power generation units without increasing the total axial length of the tandem alternator 1A.

While the above particular embodiments of the invention have been shown and described, it will be understood by those who practice the invention and those skilled in the art that various modifications, changes, and improvements may be made to the invention without departing from the spirit of the disclosed concept.

For example, though the tandem alternator 1A according to the third embodiment includes only the two cooling fans 13 and 28, it is also possible for the alternator 1A to further include a third cooling fan fixed to the rear end of the pole cores 9 and a fourth cooling fan fixed to the front end of the pole cores 24.

Moreover, though the alternators 1 and 1A according to the previous embodiments are described as for use in an automobile, they may also be used for any other purposes.

Such modifications, changes, and improvements within the skill of the art are intended to be covered by the appended claims.

What is claimed is:

1. An alternator comprising:
a rotor including a rotary shaft, a field core, and a field coil, the field core being fixed on the rotary shaft, the field coil being wound around the field core and having a first and a second end that are opposite to each other in an axial direction of the rotary shaft;
a stator including an armature core and an armature coil, the armature core surrounding an outer periphery of the field core and having a first and a second end that are opposite to each other in the axial direction of the rotary shaft, the first end of the armature core being closer to the first end of the field coil than the second end of the field coil in the axial direction, the armature coil being wound around the armature core; and
at least one cooling fan fixed on the rotary shaft so as to create a cooling air flow with rotation of the rotary shaft,
wherein
a distance between the first and second ends of the field coil is less than a distance between the first and second ends of the armature core in the axial direction of the rotary shaft,
the first end of the field coil protrudes outward from the first end of the armature core in the axial direction of the rotary shaft,
the field core has a first and a second end that are opposite to each other in the axial direction of the rotary shaft, the first end of the field core being closer to the first end of the field coil than the second end of the field coil in the axial direction,
the armature coil has a first and a second end that protrude respectively from the first and second ends of the armature core in the axial direction of the rotary shaft,
a distance between the first and second ends of the field core is less than a distance between the first and second ends of the armature coil in the axial direction of the rotary shaft, and
the first end of the field core protrudes outward from the first end of the armature coil in the axial direction of the rotary shaft.

2. The alternator as set forth in claim 1, wherein the field core is configured with a pair of lundell-type pole cores each having a plurality of claws extending in the axial direction of the rotary shaft, the claws of one of the pole cores being interleaved with the claws of the other pole core.

3. The alternator as set forth in claim 2, wherein the rotor further includes a plurality of permanent magnets each of which is interposed between adjacent two of the claws of the pole cores in a circumferential direction of the rotary shaft.

4. The alternator as set forth in claim 1, wherein the at least one cooling fan comprises a cooling fan that is fixed to the second end of the field core and disposed radially inward of an end portion of the armature coil, which extends in the axial direction of the rotary shaft between the second ends of the armature core and the armature coil, so as to face a whole radially inner surface of the end portion of the armature coil.

5. The alternator as set forth in claim 4, wherein the cooling fan is welded to the second end of the field core with weld beads formed linearly and continuously.

6. The alternator as set forth in claim 1, wherein the rotor further includes a second field core and a second field coil, the second field core being fixed on the rotary shaft in tandem with the field core, the second field coil being wound around the second field core and having a first and a second end that are opposite each other in the axial direction of the rotary shaft, the first end of the second field coil being closer to the first end of the field coil than the second end of the field coil in the axial direction,
the stator further includes a second armature core and a second armature coil, the second armature core surrounding an outer periphery of the second field core and having a first and a second end that are opposite to each other in the axial direction of the rotary shaft, the first end of the second armature core being closer to the first end of the armature core than the second end of the armature core in the axial direction, the second armature coil being wound around the second armature core, and the at least one cooling fan includes a first cooling fan fixed to the field core and a second cooling fan fixed to the second field core, and wherein a distance between the first and second ends of the second field coil is less than a distance between the first and second ends of the second armature core in the axial direction of the rotary shaft, and the first end of the second field coil protrudes outward from the first end of the second armature core in the axial direction of the rotary shaft.

7. The alternator as set forth in claim 6, wherein the second field core is configured with a second pair of lundell-type pole cores each having a plurality of claws extending in the axial direction of the rotary shaft, the claws of one of the second pair of pole cores being interleaved with the claws of the other of the second pair.

8. The alternator as set forth in claim 7, wherein the rotor further includes a plurality of permanent magnets each of which is interposed between adjacent two of the claws of the second pair of pole cores in the circumferential direction of the rotary shaft.

9. The alternator as set forth in claim 6, wherein the second field core has a first and a second end that are opposite to each other in the axial direction of the rotary shaft, the first end of the second field core being closer to the first end of the second field coil than the second end of the second field coil in the axial direction;

the second armature coil has a first and a second end that protrude respectively from the first and second ends of the second armature core in the axial direction of the rotary shaft, a distance between the first and second ends of the second field core is less than a distance between the first and second ends of the second armature coil in the axial direction of the rotary shaft, and the first end of the second field core protrudes outward from the first end of the second armature coil in the axial direction of the rotary shaft.

10. The alternator as set forth in claim 9, wherein the first cooling fan is fixed to the second end of the field core and disposed radially inward of an end portion of the armature coil, which extends in the axial direction of the rotary shaft between the second ends of the armature core and the armature coil, so as to face a whole radially inner surface of the end portion of the armature coil, and the second cooling fan is fixed to the second end of the second field core and disposed radially inward of an end portion of the second armature coil, which extends in the axial direction of the rotary shaft between the second ends of the second armature core and the second armature coil, so as to face a whole radially inner surface of the end portion of the second armature coil.

11. The alternator as set forth in claim 10, wherein the first and second cooling fans are respectively welded to the second ends of the field core and the second field core with weld beads formed linearly and continuously.

12. The alternator as set forth in claim 1, wherein the rotary shaft is configured to be driven by an engine of an automobile.

\* \* \* \* \*